US010479286B2

(12) United States Patent
Konevsky et al.

(10) Patent No.: US 10,479,286 B2
(45) Date of Patent: Nov. 19, 2019

(54) APPARATUS FOR LIGHT INTENSITY ADJUSTMENT

(71) Applicants: Oleg Konevsky, Kernen (DE); Philipp Hottmann, Remshalden (DE)

(72) Inventors: Oleg Konevsky, Kernen (DE); Philipp Hottmann, Remshalden (DE)

(73) Assignee: SMR Patents S.à.r.l., Luxembourg (LU)

( * ) Notice: Subject to any disclaimer, the term of this patent is extended or adjusted under 35 U.S.C. 154(b) by 729 days.

(21) Appl. No.: 14/809,509

(22) Filed: Jul. 27, 2015

(65) Prior Publication Data

US 2016/0096487 A1  Apr. 7, 2016

(30) Foreign Application Priority Data

Jul. 25, 2014 (EP) .................................... 14178462

(51) Int. Cl.
*B60R 11/04* (2006.01)
*H04N 5/238* (2006.01)
*H04N 5/225* (2006.01)

(52) U.S. Cl.
CPC ........... *B60R 11/04* (2013.01); *H04N 5/2254* (2013.01); *H04N 5/2256* (2013.01); *H04N 5/238* (2013.01)

(58) Field of Classification Search
CPC .... B60R 11/04; H04N 5/2254; H04N 5/2256; H04N 5/238
See application file for complete search history.

(56) References Cited

U.S. PATENT DOCUMENTS 6,028,303 A * 2/2000 Suzuki ................. G02B 27/281
 250/225
7,872,666 B2 * 1/2011 Van Schaik .......... G02B 27/281
 348/57

(Continued)

FOREIGN PATENT DOCUMENTS

DE    20 2006 007 602 U1    8/2006
JP        2002 169195 A      6/2002
(Continued)

OTHER PUBLICATIONS

European Search Report dated Aug. 26, 2014 regarding European patent application No. 14178462.9.

*Primary Examiner* — Gelek W Topgyal
(74) *Attorney, Agent, or Firm* — Jones Day

(57) ABSTRACT

An apparatus for light intensity adjustment mountable on an automotive camera includes at least one first linear polarizing filter, at least one second linear polarizing filter, the first linear polarizing filter and the second polarizing filter are arrangeable in front of a lens unit of an automotive camera such that incident light passes through the at least one first linear polarizing filter and the at least one second linear polarizing filter before entering the lens unit of the automotive camera, and at least one actuator for moving the at least one first linear polarizing filter and/or the at least one second linear polarizing filter with respect to each other such that the intensity of the emergent light is adjustable. The apparatus is characterized in enabling adjustment of the emergent light intensity by moving the first linear polarizing filter and/or the second linear polarizing filter with respect to each other.

16 Claims, 10 Drawing Sheets

(56) References Cited

U.S. PATENT DOCUMENTS

| | | | | |
|---|---|---|---|---|
| 8,630,037 B1* | 1/2014 | Osterman | | G02B 5/281 |
| | | | | 359/350 |
| 9,106,840 B2* | 8/2015 | Osoinach | | H04M 1/0264 |
| 9,686,474 B2* | 6/2017 | Davis | | H04N 5/2353 |
| 2002/0057338 A1* | 5/2002 | Fujiwara | | H04N 13/021 |
| | | | | 348/49 |
| 2002/0088927 A1* | 7/2002 | Simchoni | | G02B 7/005 |
| | | | | 250/225 |
| 2004/0223075 A1* | 11/2004 | Furlan | | H04N 5/2254 |
| | | | | 348/363 |
| 2007/0296843 A1* | 12/2007 | Kasuga | | H01L 27/1462 |
| | | | | 348/294 |
| 2008/0252882 A1* | 10/2008 | Kesterson | | G02B 5/208 |
| | | | | 356/300 |
| 2008/0317459 A1* | 12/2008 | Chih | | G03B 9/08 |
| | | | | 396/457 |
| 2009/0174784 A1* | 7/2009 | Karlsson | | H04N 5/2353 |
| | | | | 348/222.1 |
| 2010/0157082 A1* | 6/2010 | Katerberg | | G02B 27/281 |
| | | | | 348/222.1 |
| 2011/0043623 A1* | 2/2011 | Fukuta | | G02B 27/0018 |
| | | | | 348/135 |
| 2012/0105598 A1* | 5/2012 | Hiramoto | | G03B 35/08 |
| | | | | 348/49 |
| 2012/0140985 A1* | 6/2012 | Hattori | | H04N 5/147 |
| | | | | 382/103 |
| 2013/0063676 A1* | 3/2013 | Tsuchihashi | | G02F 1/13318 |
| | | | | 349/54 |
| 2013/0182169 A1* | 7/2013 | Kosugi | | G02B 23/2415 |
| | | | | 348/335 |
| 2015/0181098 A1* | 6/2015 | Davis | | G03B 9/08 |
| | | | | 348/342 |
| 2015/0205034 A1* | 7/2015 | Facke | | G02B 6/0035 |
| | | | | 362/606 |
| 2015/0219809 A1* | 8/2015 | Ruhnau | | H04N 5/35563 |
| | | | | 348/360 |
| 2016/0096487 A1* | 4/2016 | Konevsky | | H04N 5/238 |
| | | | | 348/148 |

FOREIGN PATENT DOCUMENTS

| | | | | |
|---|---|---|---|---|
| JP | 2006 013731 A | | 1/2006 | |
| JP | 2006013731 A | * | 1/2006 | ............... H04N 9/04 |
| JP | 2008 145889 A | | 6/2008 | |

* cited by examiner

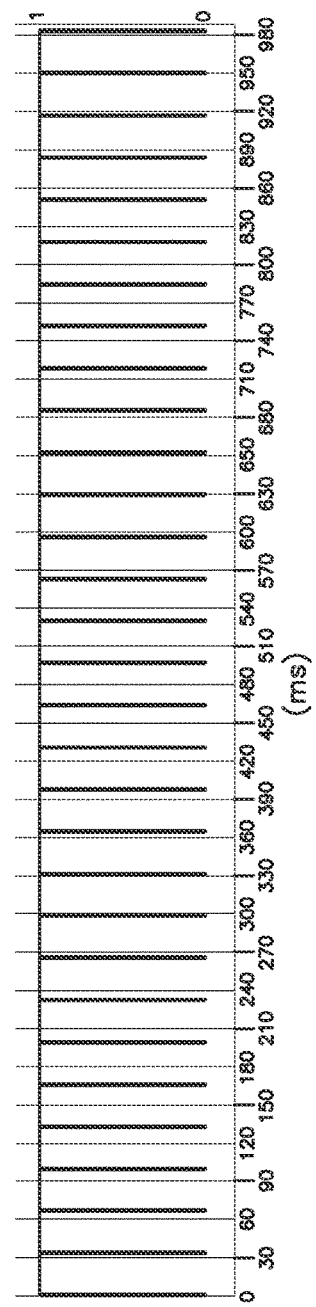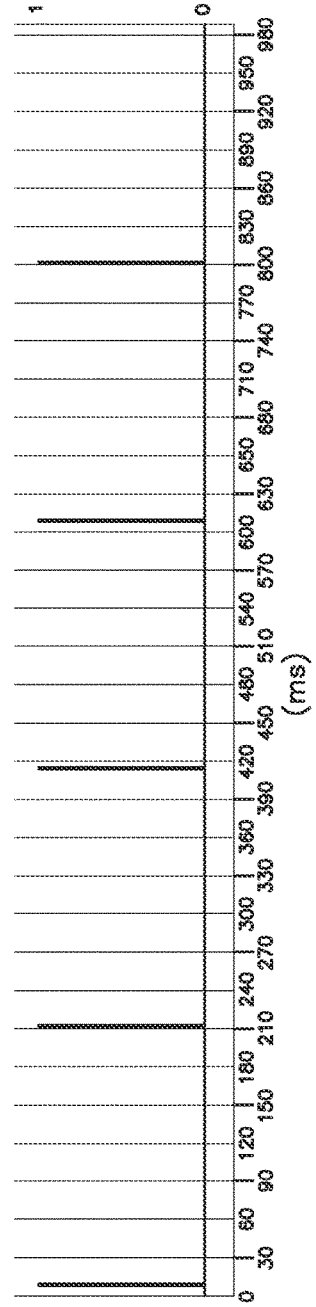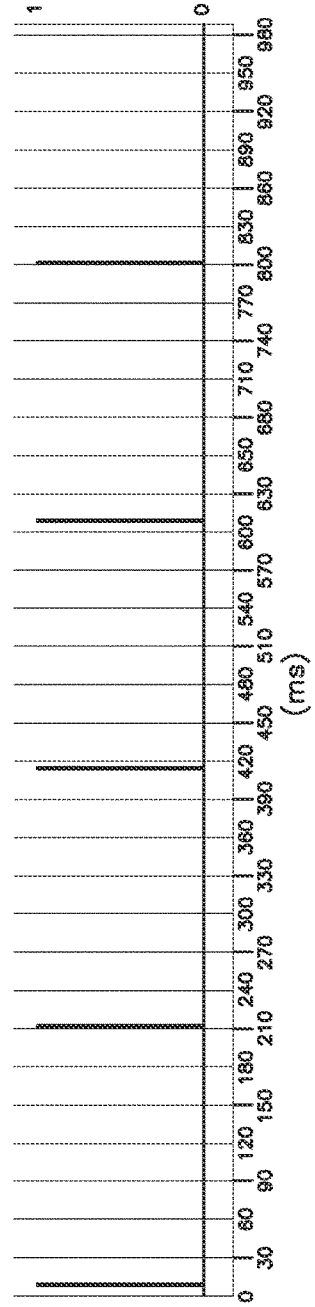

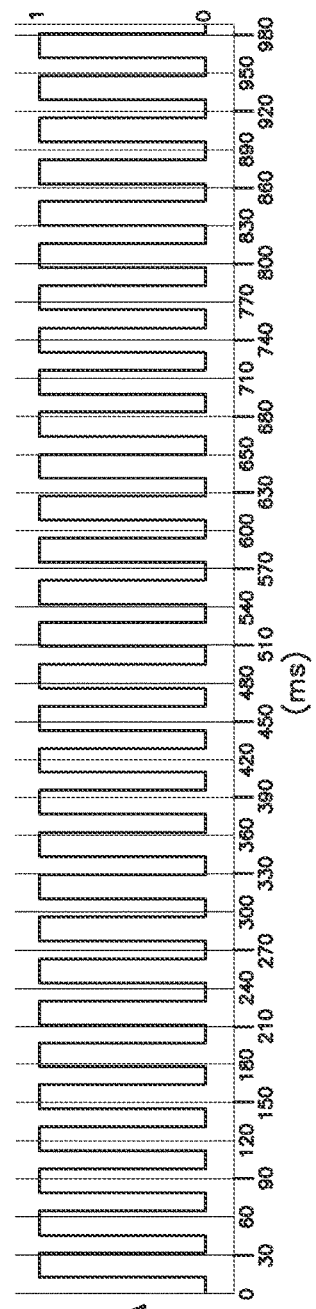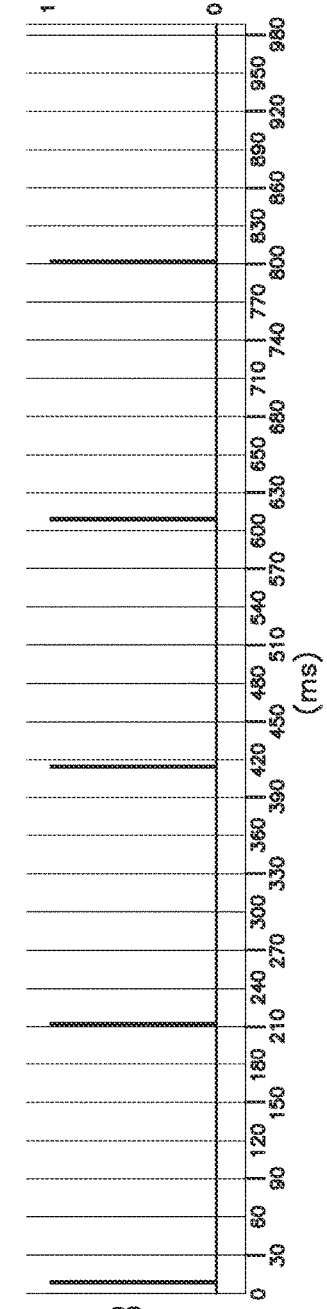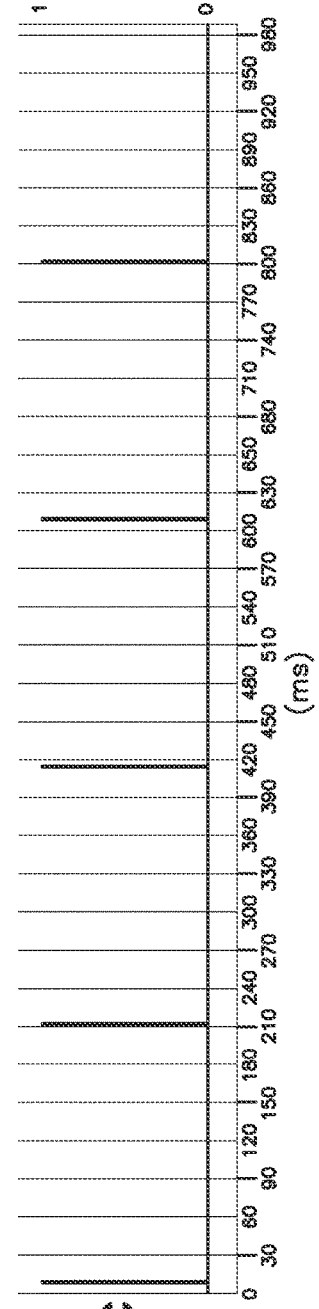

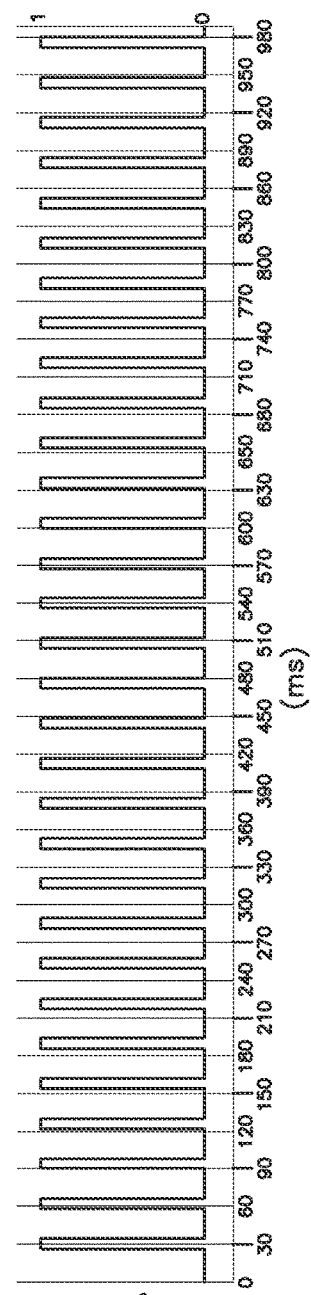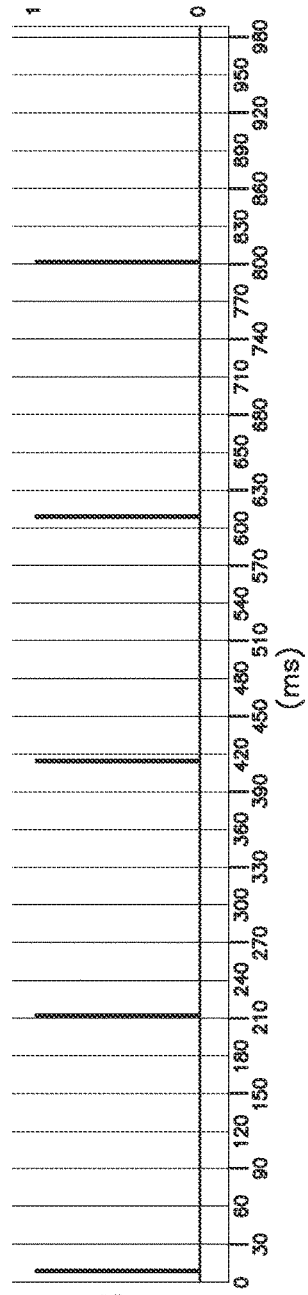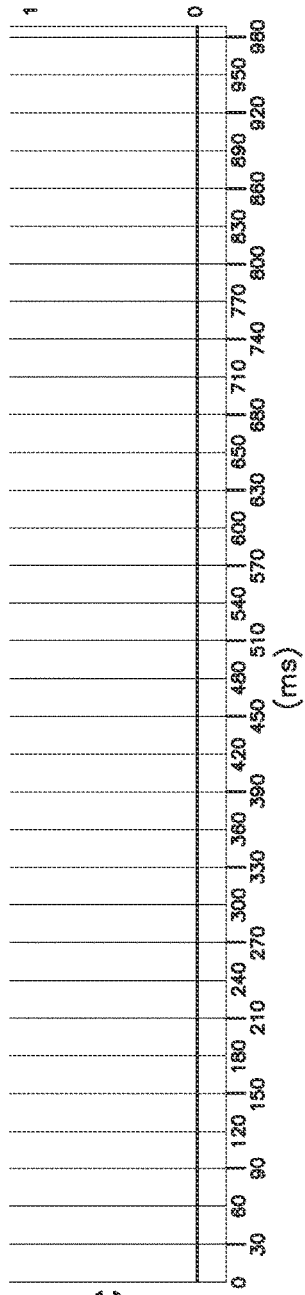

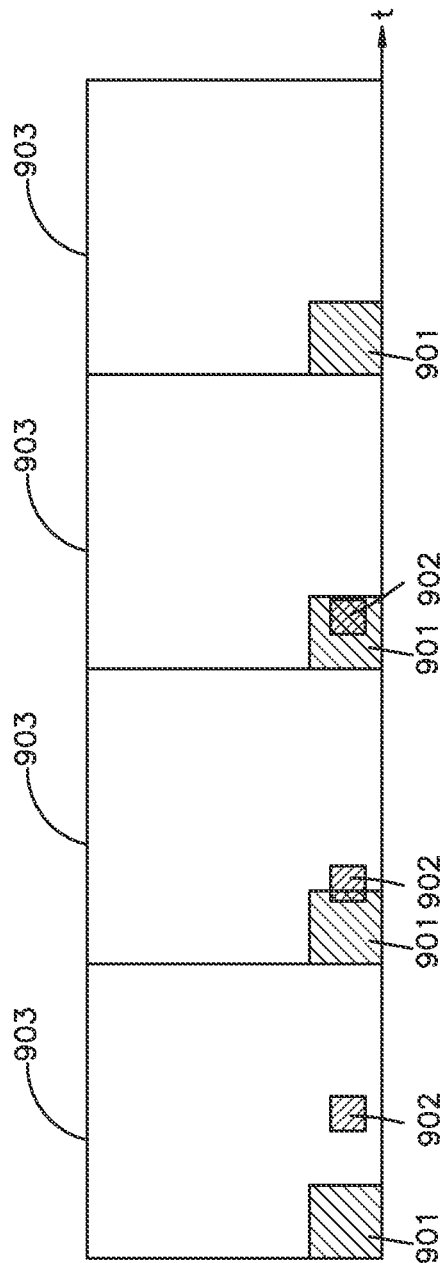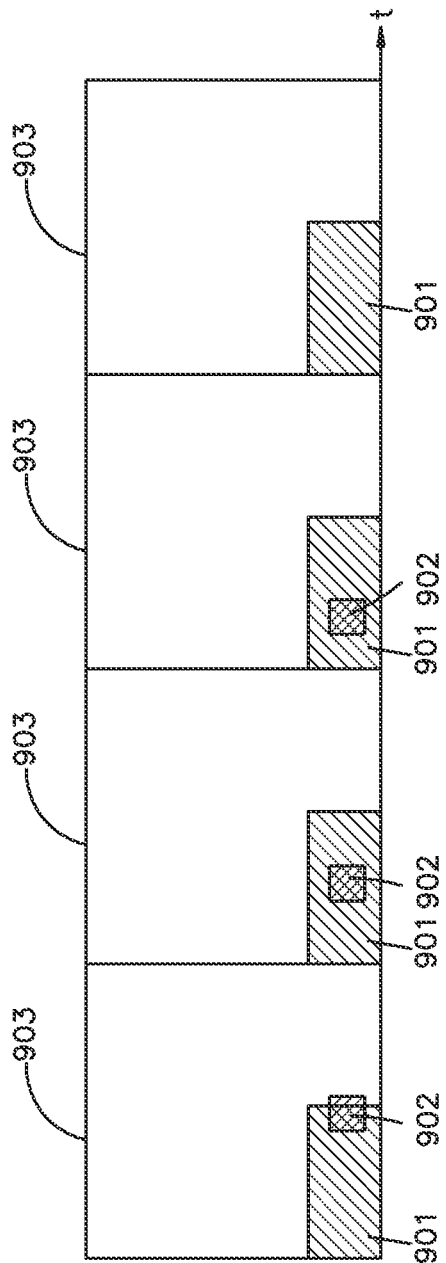

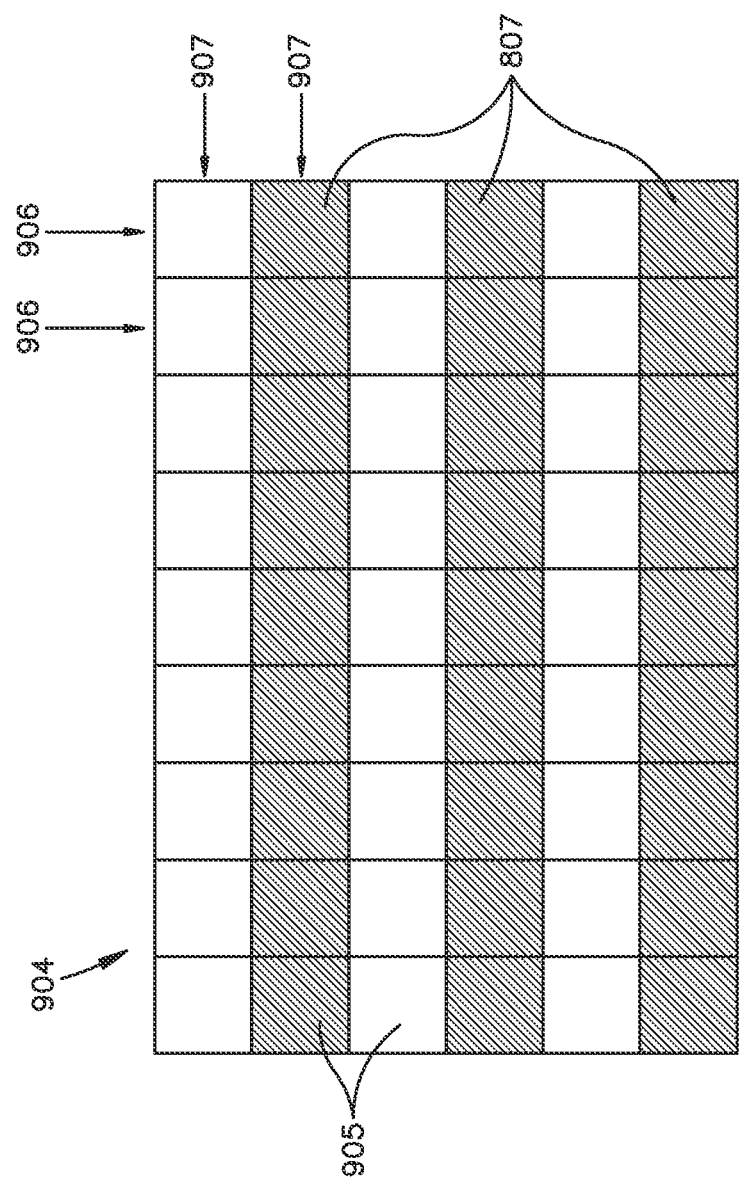

APPARATUS FOR LIGHT INTENSITY ADJUSTMENT

CROSS-REFERENCE TO RELATED APPLICATIONS

This application claims priority to European Patent Application No. 14 178 462.9, filed in the European Patent Office on Jul. 25, 2014. This application is hereby incorporated by reference for all purposes in its entirety.

BACKGROUND

1. Field

The present invention relates to an apparatus for light intensity adjustment mountable on an automotive camera, comprising at least one first linear polarizing filter, at least one second linear polarizing filter, the first linear polarizing filter and the second polarizing filter are arrangeable in front of a lens unit of an automotive camera such that incident light passes through the at least one first linear polarizing filter and the at least one second linear polarizing filter before entering the lens unit of the automotive camera, and at least one actuator for moving the at least one first linear polarizing filter and/or the at least one second linear polarizing filter with respect to each other such that the intensity of the emergent light is adjustable. Further the present invention relates to an automotive camera with such an apparatus and a vehicle comprising such an automotive camera and/or such an apparatus.

2. Description of Related Art

Cameras are getting increasingly popular for automotive applications: Back-up assist, parking assist, side or interior mirror replacement, mirror blind spot monitoring, lane change assist, to name a few. One of the main components of a camera used for these applications is an image sensor. The image sensor consists of a plurality of pixels, light sensitive elements that collect incident light projected by the lens unit, and transform it into an electrical signal. This signal can be read out from the pixel and stored, transmitted to the display unit for viewing by a driver, used for object detection or recognition, etc.

Pixels are read out with the predefined frequency, called frame rate. For most automotive applications an adequate frame rate is in the range of 15 to 60 frames per second (fps). Some image sensors allow selection of a frame rate at system start up, however, typically, once selected, the frame rate cannot be changed without re-initialization of the imager. Theoretically, a pixel can collect the light between the two consequent read-outs. Thus, for example, if the imager has been initialized to operate at 30 fps, the pixel accumulates the light within 33 ms. However, the lighting conditions under which an automotive camera is supposed to operate, can vary significantly: From 1 Lux illumination at night to 20,000 Lux on a sunny day. And while for low light conditions 33 ms integration time might be adequate, it may be too long for high light conditions. In this case the pixel will be overexposed, i.e., the electrical signal output by the pixel will be driven to its maximum regardless of small variations in object brightness.

In order to overcome this problem, image sensors allow variable integration time while maintaining fixed frame rate. This is achieved by changing time between pixel reset and read out. Whatever charge has been accumulated by the pixel before the reset occurs, it is eliminated. This part of the frame period is often referred to as "closed shutter", a term coming from film photography where mechanical shutter was used to adjust exposure time. Thus, integration time is defined not by the period between two consecutive frames, or in other words, between two consecutive pixel read outs, but by the period between pixel reset and pixel read out instead. This part of the frame period is called "open shutter". In order to reduce the amount of light transformed into electrical signal, time between pixel reset and read out is reduced by moving reset as close to read out as necessary. Moving reset towards previous frame read out increases the integration time. Obviously, maximum integration time is limited by the time between two consecutive frames read outs, which in the above example is 33 ms.

However, while solving the problem of imager adaptation to different lighting conditions, variable integration time causes a new problem, which is often referred to as stroboscopic effect. Modern light sources, for example light emitting diodes (LED) often illuminate the scene not continuously, but in short pulses instead. This is because the intensity of light cannot be controlled efficiently by changing the voltage; instead pulse width modulation (PWM) is used. In this case the LED is turned on for several milliseconds, and then switched off for another several milliseconds. By changing the ratio between on and off periods, the overall intensity of light can be adjusted.

Moreover, some devices require that the light is emitted in short flashes, for example emergency vehicle lighting used to convey to other road users the urgency of their journey, or provide warning of hazard when stationary. Strobe lights or LEDs are increasingly popular for those devices. Duration of flashes may be as short as hundreds of microseconds, and their frequency as low as a few Hertz.

In these cases duration of flash emitted by a light source is significantly shorter than the part of frame period corresponding to the open shutter. If the flash occurs when the shutter is closed, the flash cannot be captured by the imager. Thus, the frame in the video stream will appear as if there were no flash at all.

SUMMARY

FIGS. 1 to 4 illustrate how shutter timing influences the severity of the effect. FIGS. 1a-1c include a timing diagram 100, depicting phases of shutter (FIG. 1a), light source (FIG. 1b) and result of the superposition of the former two (FIG. 1c), when the shutter is closed for 1 ms and open for 32 ms. FIGS. 2a-2c include a timing diagram 200, depicting phases of shutter (FIG. 2a), light source (FIG. 2b) and result of the superposition of the former two (FIG. 2c), when the shutter is closed for 11 ms and open for 22 ms. FIGS. 3a-3c include a timing diagram 300, depicting phases of shutter (FIG. 3a), light source (FIG. 3b) and result of the superposition of the former two (FIG. 3c), when the shutter is closed for 15 ms and open for 18 ms. FIGS. 4a-4c include a timing diagram 400, depicting phases of shutter (FIG. 4a), light source (FIG. 4b) and result of the superposition of the former two (FIG. 4c), when the shutter is closed for 25 ms and open for 8 ms. In these examples, the sensor operates at a frame rate of 30 fps, which corresponds to the frame period of approximately 33 ms. Flashes of strobe light occur with the frequency of 5 Hz and have a duration of 1 ms. Thus, within the depicted time span of 1000 ms, 5 flashes occur. The upper graph in each figure (FIG. 1a, 2a, 3a, 4a) shows the status of the shutter: highs (denoted as 1) correspond to open shutter, lows (denoted as 0) to a closed one. The middle graph (FIG. 1b, 2b, 3b, 4b) shows flashes with highs (denoted as 1) being flash turned on, lows (denoted as 0) off. And finally, the lower graph (FIG. 1c, 2c, 3c, 4c) represents flashes, captured by the sensor. Obviously, if highs of the upper two graphs coincide, the flash is captured, if not the flash is missed by the sensor.

As FIGS. 1a-1c demonstrate, when the shutter is closed for 1 ms and open for 32 ms, all the flashes have been captured. In FIGS. 2a-2c, it is suggested that if the shutter stays closed for 11 ms and then open for 22 ms, the very first flash is missing in the resulting graph. Furthermore, if the shutter is closed for 15 ms, and open for 18 ms, as shown in the FIGS. 3a-3c, three out of five flashes are missed. In this case, the first captured flash occurs only about 610 ms after start. If the ratio of closed to open shutter changes even more, such as 25 ms to 8 ms, as shown in FIGS. 4a-4c, none of the flashes occurred within 1000 ms from the start is captured by the sensor. The situation, depicted in FIGS. 4a-4c, may cause safety problems for the driver. For example, emergency lighting will appear switched off on the display. Similarly, the driver will not be able to see with the mirror replacing camera LED day lights of the overtaking vehicles. This may reduce the driver's ability to react on the road situation adequately and in time, and thus may result in a road accident.

In order to avoid a stroboscopic effect, one needs to keep the integration time as close to the time period between two consecutive read outs as possible. I.e. instead of reducing the integration time in the high light conditions, one should artificially reduce the intensity of the light that incidents the imager. In conventional photography, this is achieved by adjusting the diameter of stop inside the lens. The stop diameter is reduced, if the intensity of ambient light increases, and is increased, if the scene gets darker. Thus, the amount of light, accumulated by the pixels, remains within the optimal limits, and the overall image brightness is kept at a reasonable level.

However, mechanical stop mechanisms, integrated into the lenses, common in conventional photography are hardly applicable to the lenses, used in automotive cameras. First of all, automotive applications require highest reliability and durability of the stop mechanism. Secondly, the space, where the automotive camera is mounted, is typically very limited by the design of the surrounding components. This requires that the lens remains relatively miniature; usually, the largest outer diameter of the lens does not exceed 20 mm. Building into such a miniature lens a highly reliable and durable stop mechanism that includes an actuator, is an extremely challenging task. Apart from that, such a lens with adjustable stop diameter would be significantly more expensive than a similar lens with a fixed stop diameter.

A problem to be solved by aspects of the invention is to provide a mechanism that allows an automotive camera accurately operating in different lighting conditions.

The problem is solved by a first embodiment of an apparatus, described at the beginning, enabling adjustment of the emergent light intensity by moving the first linear polarizing filter and/or the second linear polarizing filter with respect to each other is coupled to a frame rate of an image sensor of the an automotive camera by the actuator, in particular such that the integration time of the sensor is maintained at the maximum. Therefore, an automotive camera including such apparatus can be accurately operated in different lighting conditions.

Mounting such first embodiment of an apparatus for light intensity adjustment on an automotive camera, eliminates the need of changing the design of the lens unit, in particular the stop integrated into the lens unit may remain fixed. Thus, the stop mechanism integrated into the lens of the camera further provides highest reliability and durability. The apparatus may be mounted on an automotive camera with miniature lens unit without significantly increasing the space, where the automotive camera is mounted.

In one further embodiment of the first embodiment of the apparatus, the first linear polarizing filter is fixedly secured, and the second linear polarizing filter is moveable by the actuator. In the further embodiment, the first linear polarizing filter is moveable by the actuator, and the second linear polarizing filter is fixedly secured. In a further embodiment, both polarizing filters are moveable by the same at least one actuator, or every linear polarizing filter is moveable by its own actuator.

In further embodiments, three or more polarizing filters, fixedly secured or moveable by the same or own actuators, are thinkable.

According to an implementation form of the first embodiment of the apparatus, the actuator is configured to provide the first orientation of the first and/or the second linear polarizing filters, in case of low-light conditions, in which first orientation both filters polarize the incident light in a same plane. The first orientation of the polarizing filters enables an automotive camera operating accurately in low-light conditions.

According to an implementation form of the first embodiment of the apparatus, the actuator is configured to provide the second orientation of the first and the second linear polarizing filters in case of high-light conditions, in which second orientation polarization planes of both filters are close to be perpendicular to each other. The second orientation of the polarizing filters enables an automotive camera operating accurately in high-light conditions.

According to an implementation form of the first embodiment of the apparatus, the actuator is configured to provide a third orientation of the first and the second linear polarizing filters in case of intermediate-light conditions, in which third orientation lies between the first orientation and the second orientation of the linear polarizing filters. The third orientation of the polarizing filters enables an automotive camera operating accurately in intermediate-light conditions.

According to an implementation form of the first embodiment of the apparatus, the first linear polarizing filter is fixedly mountable in front of the lens unit, and the second linear polarizing filter is movable with respect to the first linear polarizing filter. By moving the second linear polarizing filter with respect to the first linear polarizing filter, the camera can be accurately operated under different lighting conditions. Such an apparatus allows avoiding stroboscopic effects.

According to an implementation form of the first embodiment of the apparatus, the actuator is configured to rotate the second linear polarizing filter about a rotation axis, in particular by at least 90 degrees. By rotating the second linear polarizing filter about a rotation axis, in particular by at least 90 degrees, light exposure of the image sensor can be effectively controlled in the entire range of possible lighting conditions.

According to an implementation form of the first embodiment of the apparatus, the rotation axis of the moveable filter approximately coincides with an optical axis of the lens unit, when the apparatus is mounted on the camera. Such an arrangement enables minimizing the form factor of the device.

According to an implementation form of the first embodiment of the apparatus, the apparatus comprises an inner ring carrying the second linear polarizing filter, and an outer ring carrying the first linear polarizing filter, wherein both the inner ring and the outer ring are aligned with the optical axis of the lens unit, when the apparatus is mounted on the camera. Such an arrangement is easy to manufacture and requires only a small space. Besides, a position sensor for sensing the position of the filters becomes redundant. Instead, an algorithm for finding optimum orientation of the filters by measuring the image brightness can be applied.

According to an implementation form of the first embodiment of the apparatus, the actuator comprises a worm wheel configured to move the inner ring. Such a worm wheel is compact, robust in implementation, and prevents unintentional rotation of the inner ring due to vibrations or mechanical impact.

According to an implementation form of the first embodiment of the apparatus, the rotation axis of the moveable polarizing filter is approximately parallel to an optical axis of the lens unit, when the apparatus is mounted on the camera. By shifting the axis of rotation to be parallel to the optical axis of the lens unit such, that it is outside of the outer diameter of the lens unit, the rotation mechanism is simplified. In particular a worm wheel is not required. This simplifies the integration and reduces the costs of the device while increasing its robustness.

According to an implementation form of the first embodiment of the apparatus, the first linear polarizing filter is approximately formed as a circle having a center, coinciding with the optical axis of the lens unit, when the apparatus is mounted on the camera, and the second linear polarizing filter is approximately formed as a semi circle, having a center, coinciding with the rotation axis of the actuator. Such a circle and a semi circle are easy to manufacture, and provide sufficient overlapping area where a light intensity can be adjusted.

Furthermore the problem is solved by a second embodiment of an apparatus for light intensity adjustment mountable on an automotive camera, comprising: at least one grey filter, which is arrangeable in front of a lens unit of an automotive camera such that incident light passes through the at least one grey before entering the lens unit of the automotive camera, characterized by adjustment of the emergent light intensity by dimming the at least one grey filter to at least a frame rate of an image sensor of the an automotive camera such that the integration time of the sensor is maintained at the maximum.

By using a grey filter the exposure time of the image sensor can be extended, without changing the brideness of the displayed picture.

Further, the grey filter can be, in particular electronically, adjustable, in particular in different dimming levels. In said embodiment of the apparatus the apparatus can work under day and night conditions easily.

The second embodiment of the apparatus is easy to realize, if the grey filter comprises liquid crystals and/or electrocromic liquids.

The grey filter can be a separate or separatable part and/or a part of an optical member of the lens unit, i.e of the image sensor and/or of a lens of the lens unit. If the grey filter is a separate or separatable part it can be mounted easily. If the grey filter is a part of the image sensor and/or of a lens of the lens unit the apparatus can be realized compact.

Further the optical member can comprise a plurality of optical elements, i.e. pixels, arranged in a plurality of columns and/or rows, wherein at least every second column and/or row provides a grey filter.

Basically, the second embodiment of the Apparatus works only using the grey filter solution or only the first and second linear polarization filter solution.

According to an implementation form of the second embodiment of the apparatus the apparatus comprises at least one first linear polarizing filter, at least one second linear polarizing filter, the first linear polarizing filter and the second polarizing filter are arrangeable in front of the lens unit of the automotive camera such that incident light passes through the at least one first linear polarizing filter and the at least one second linear polarizing filter before entering the lens unit of the automotive camera, and at least one actuator for moving the at least one first linear polarizing filter and/or the at least one second linear polarizing filter with respect to each other such that the intensity of the emergent light is adjustable, wherein the emergent light intensity is further adjustable by moving the first linear polarizing filter and/or the second linear polarizing filter with respect to each other is coupled to a frame rate of an image sensor of the an automotive camera by the actuator such that the integration time of the sensor is maintained at the maximum.

According to an implementation form of the second embodiment of the apparatus the actuator is configured to provide a first orientation of the first linear polarizing filter and/or the second linear polarizing filter in case of low-light conditions, wherein both linear polarizing filters polarize the incident light in a same plane.

According to an implementation form of the second embodiment of the apparatus the actuator is configured to provide a second orientation of the first linear polarizing filter and the second linear polarizing filter in case of high-light conditions in which second orientation polarization planes of both filters are close to be perpendicular to each other.

According to an implementation form of the second embodiment of the apparatus the actuator is configured to provide a third orientation of the first linear polarizing filter and/or the second linear polarizing filter in case of intermediate-light conditions, wherein the third orientation lies in between the first orientation and the second orientation of the linear polarizing filters.

According to an implementation form of the second embodiment of the apparatus the first linear polarizing filter is fixedly mountable in front of the lens unit, and the second linear polarizing filter is movable with respect to the first linear polarizing filter.

The actuator can be configured to rotate the second linear polarizing filter about a rotation axis, in particular by at least 90 degrees.

Further the rotation axis can approximately coincide with an optical axis of the lens unit, when the apparatus is mounted on the camera.

According to an implementation form of the second embodiment of the apparatus the apparatus comprises an inner ring, carrying the second linear polarizing filter, and an outer ring, carrying the first linear polarizing filter, wherein both the inner ring and the outer ring are aligned with the optical axis of the lens unit, when the apparatus is mounted on the camera.

The actuator can comprise a worm wheel, configured to move the inner ring. According to an implementation form of the second embodiment of the apparatus the rotation axis is approximately parallel to an optical axis of the lens unit when the apparatus is mounted on the camera.

According to an implementation form of the second embodiment of the apparatus the first linear polarizing filter is approximately formed as a circle, having a center coinciding with the optical axis of the lens unit, when the apparatus is mounted on the camera, and that the second linear polarizing filter is approximately formed as a semi circle, having a center coinciding with the rotation axis of the actuator.

The problem is further solved by an automotive camera, comprising: at least one lens unit and at least one image sensor, comprising a plurality of light sensitive elements, configured to collect incident light, projected by the lens unit, and transform it into an electrical signal, wherein the image sensor is configured to read out the charge, collected by the plurality of light sensitive elements, with a predetermined frame rate. The automotive camera comprises further at least one apparatus for light intensity adjustment, in particular, having one or more of the features of the first or the second embodiment described before, which is mounted or mountable in front of the lens unit.

Mounting the apparatus for light intensity adjustment in front of the lens unit enables maintaining miniature size of the camera that is required for automotive applications. There is no need to adjust the stop mechanism, integrated into the lens unit of the camera. Thus, the stop mechanism, integrated into the lens of the camera, further provides highest reliability and durability. An automotive camera including such an apparatus can be accurately operated in different lighting conditions.

According to an implementation form of the automotive camera, integration time of the image sensor for collecting the incident light is approximately constant and is close to the frame period. That provides precise image sensing and avoids the stroboscopic effect, as no events, such as flashes, can get lost.

The problem is further solved by a vehicle, comprising at least one automotive camera, in particular, as described above, and/or at least one apparatus, in particular as described above. In such a vehicle the driver will be able to see daylights of overtaking vehicles. The driver's ability to adequately and in time react on the road situation will be significantly increased, thereby reducing accidents.

The problem is further solved by an apparatus for adjustment of light intensity that incidents a lens and a sensor, such that a pair of polarizing filters is placed on the optical path outside of the lens, and at least one of the filters is moveable. Such an apparatus allows an automotive camera accurately operating in different lighting conditions.

The problem is further solved by a camera mounted on a vehicle, such that the amount of incident light is adjusted by the apparatus for adjustment of an intensity of light. Such a camera may accurately operate in different lighting conditions.

According to an implementation form of the camera, the integration time of the sensor is kept reasonably constant and close to the maximum defined by the time period between two consecutive frame read outs. By using such integration time, no events will be missed by the camera.

The problem is solved by a method for operating an apparatus for light intensity adjustment, mounted on an automotive camera, comprising a lens unit and an image sensor, comprising a plurality of light sensitive elements, configured to collect incident light, projected by the lens unit and transform it into an electrical signal, wherein the image sensor is configured to read out the charge, collected by the plurality of light sensitive elements with a predetermined frame rate, the apparatus comprising a first and a second linear polarizing filter, arranged in front of the lens unit such that the incident light passes through both of them before entering the lens unit, the method comprising: adapting a light exposure of the image sensor to the frame rate of the image sensor and lighting conditions by moving the first and the second linear polarizing filters with respect to each other.

The problem is further solved by a method for adjusting light intensity by an apparatus for light intensity adjustment mountable on an automotive camera, comprising at least one grey filter, which is arrangeable in front of a lens unit of an automotive camera such that incident light passes through the at least one grey before entering the lens unit of the automotive camera, providing the step: dimming the at least one grey filter to at least a frame rate of an image sensor of the an automotive camera, in particular such that the integration time of the sensor is maintained at the maximum.

According to an implementation form of the method the optical member comprises a plurality of optical elements, i.e. pixels, arranged in a plurality of columns and/or rows, wherein at least every second column and/or row provides a grey filter, providing the steps: reading out the optical elements comprising the grey filter, in particular in an interlaced manner; and/or reading out all optical elements and calculating an offset.

If all optical elements are read out the calculation can comprise a comparison of the of the columns and/or rows related to their different brightness resp. darkness. An offset can be calculated and/or said differences in brightness can be complemented or removed by calculation.

Further, even if all optical elements are read out, only the darker columns and/or rows can be taken into consideration by calculation.

The problem is further solved by a computer program with a program code for performing the above-described method, when the computer program runs on a computer.

The accompanying drawings are included to provide a further understanding of aspects, and are incorporated in and constitute a part of this specification. The drawings illustrate aspects, and together with the description serve to explain principles of aspects. Other aspects and many of the intended advantages of aspects will be readily appreciated as they become better understood by reference to the following detailed description. Like reference numerals designate corresponding similar parts.

BRIEF DESCRIPTION OF THE DRAWINGS

FIGS. 1a, 1b, 1c illustrate a timing diagram 100, depicting phases of shutter (FIG. 1a), light source pulses (FIG. 1b) and result of the superposition of the former two (FIG. 1c), when the shutter is closed for 1 ms and open for 32 ms;

FIGS. 2a, 2b, 2c illustrate a timing diagram 200, depicting phases of shutter (FIG. 2a), light source pulses (FIG. 2b) and result of the superposition of the former two (FIG. 2c), when the shutter is closed for 11 ms and open for 22 ms;

FIGS. 4a, 4b, 4c illustrate a timing diagram 400, depicting phases of shutter (FIG. 4a), light source pulses (FIG. 4b) and result of the superposition of the former two (FIG. 4c), when the shutter is closed for 25 ms and open for 8 ms;

FIGS. 9a and 9b a schematic diagram of image sensor integration time, light source pulses and frame rate;

FIG. 10 a schematic top view on an optical member of the second embodiment of the apparatus.

DETAILED DESCRIPTION

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present invention. The following detailed description, therefore, is not to be taken in a limiting sense, and the scope of the present invention is defined by the appended claims.

In the following, an automotive camera with the fixed aperture and an apparatus for light intensity adjustment is described. The apparatus can be used for controlling amount of light that reaches an image sensor, also denoted as imager of the camera. The apparatus comprises two polarizer filters, one of which may move with respect to another in such a way, that the amount of transmitted light is gradually changed. This allows keeping image sensor integration time close to the frame period, thus eliminating stroboscopic effect, when dealing with light emission diode (LED) based daytime running lamps, installed on a vehicle or strobe lights of emergency lighting.

Figure 3A:
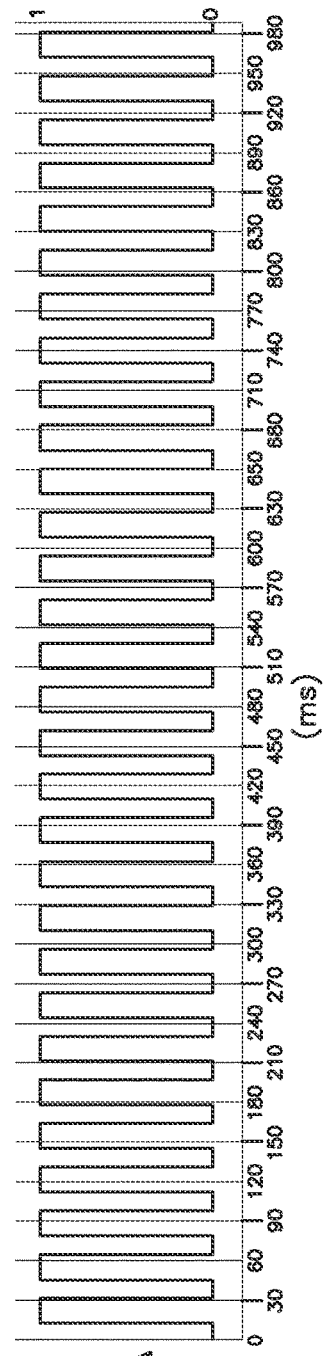
FIGS. 3a, 3b, 3c illustrate a timing diagram 300, depicting phases of shutter (FIG. 3a), light source pulses (FIG. 3b) and result of the superposition of the former two (FIG. 3c), when the shutter is closed for 15 ms and open for 18 ms.
Figure 3B:
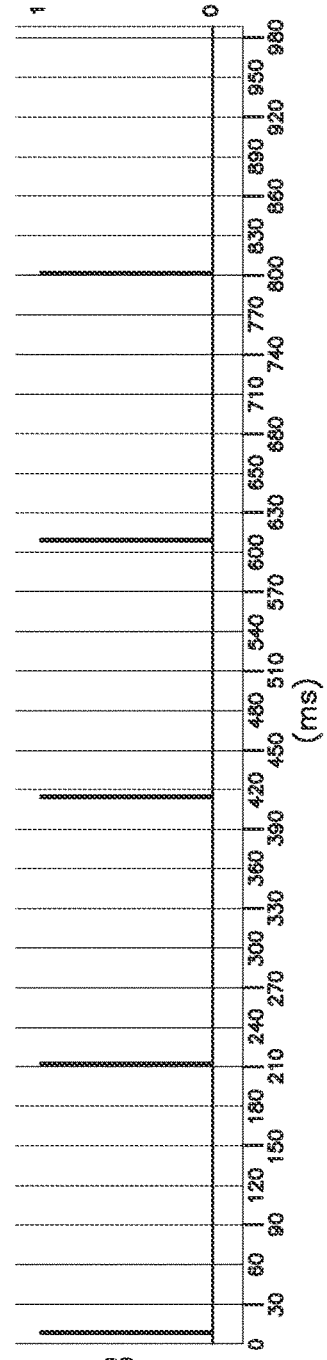
Figure 3C:
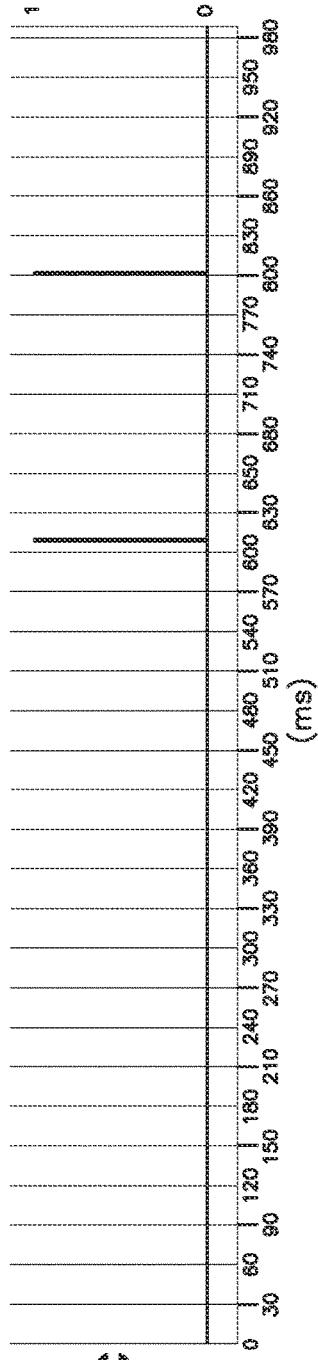
Figure 5:
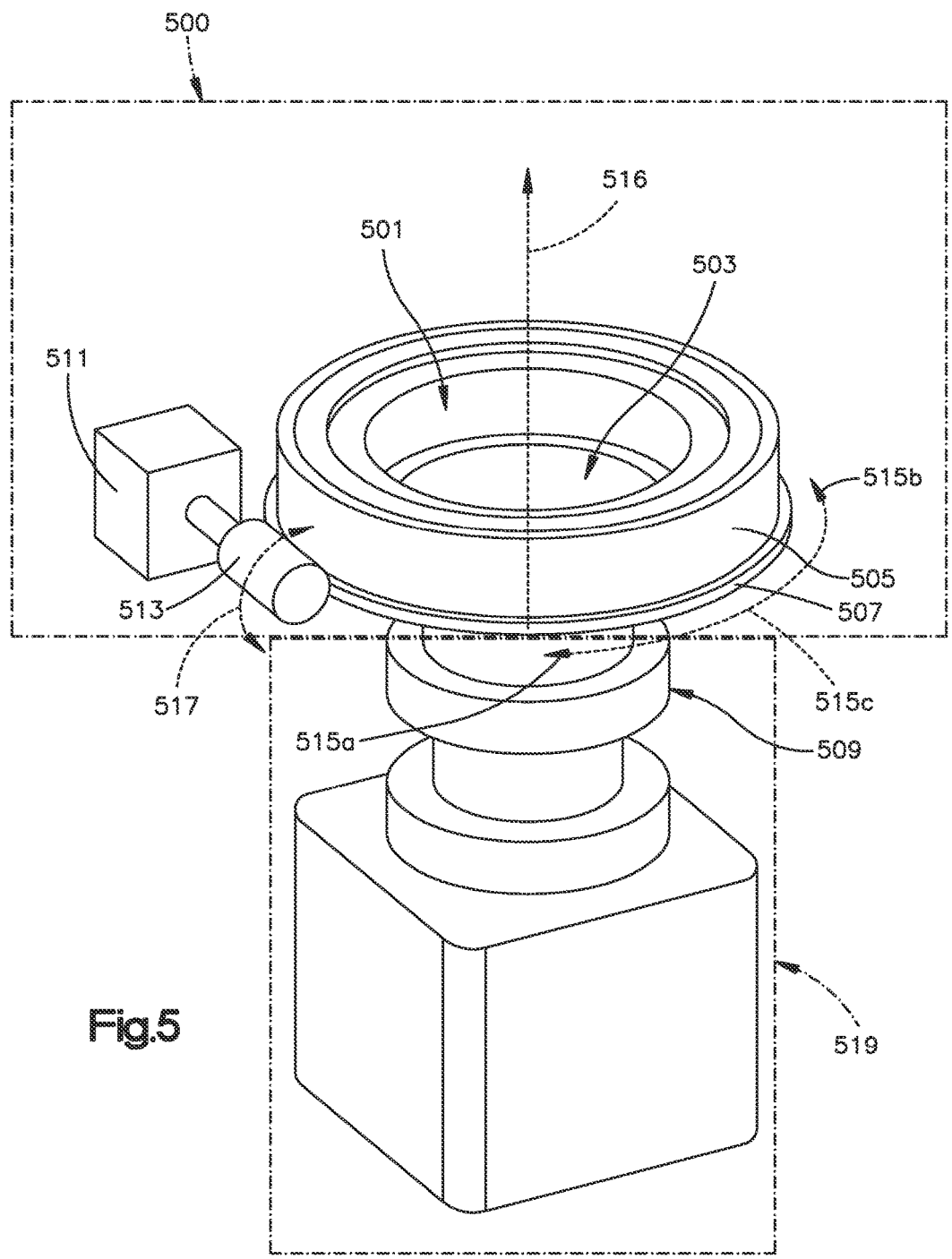
FIG. 5 is a lateral view of a first embodiment of an apparatus for light intensity adjustment 500 in a three-dimensional representation according to an implementation form.
Figure 6:
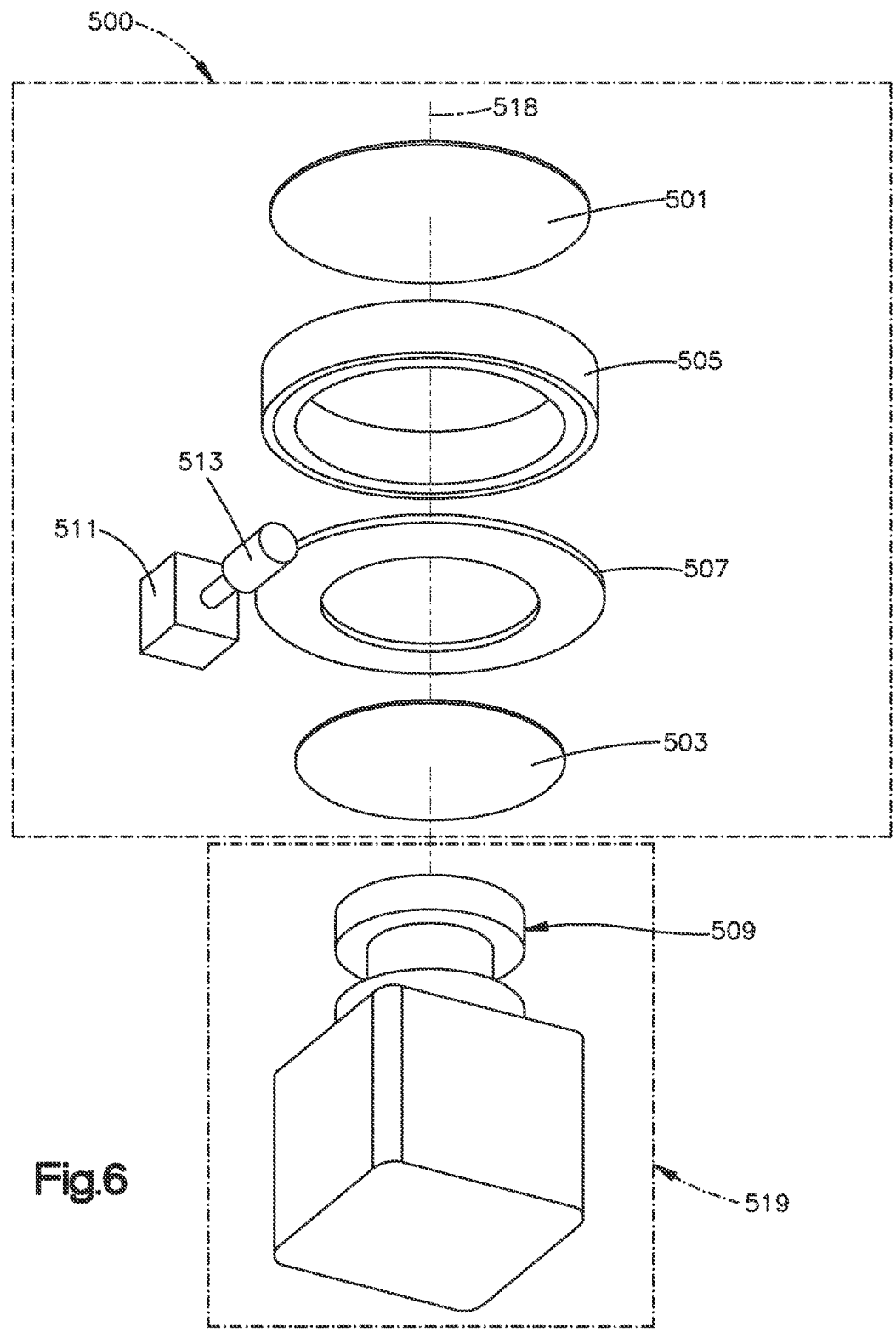
FIG. 6 is an exploded view of the apparatus 500, depicted in FIG. 5.

FIG. 5 is a lateral view of an apparatus for light intensity adjustment 500 in a three-dimensional representation according to an implementation form, and FIG. 6 illustrates an exploded view of the apparatus 500, depicted in FIG. 5. The apparatus 500 includes a first 501 and a second 503 linear polarizing filter and an actuator 511. The apparatus for light intensity adjustment 500 is mountable on an automotive camera 519. Such an automotive camera 519 may include a lens unit 509 and an image sensor (not depicted in FIG. 5), comprising a plurality of light sensitive elements, configured to collect incident light projected by the lens unit 509, and transform it into an electrical signal. The image sensor may read out the charge collected by the plurality of light sensitive elements with a predetermined frame rate. The first 501 and the second 503 linear polarizing filters are arrangeable in front of the lens unit 509, such that the incident light passes through both of them before entering the lens unit 509. The actuator 511 can move the first 501 and the second 503 linear polarizing filters with respect to each other. By that movement the actuator 511 adapts a light exposure of the image sensor to the frame rate of the image sensor and lighting conditions, when the apparatus 500 is mounted on the automotive camera 519 as depicted in FIG. 5. The apparatus 500 can be mounted on the camera 519 and can be released from the camera 519. While FIG. 5 depicts an automotive camera 519, the apparatus can also be mounted on other kinds of cameras or optical systems, for example iris, telescope, glasses etc. The size of the apparatus may be fitted to a size of the optical system, whereon the apparatus is mounted.

The actuator 511 can provide a first orientation 515a of the first 501 and the second 503 linear polarizing filters in case of low-light conditions. In that first orientation 515a both filters 501, 503 polarize the incident light in a same plane. The actuator 511 can provide a second orientation 515b of the first 501 and the second 503 linear polarizing filters in case of high-light conditions. In that second orientation 515b polarization planes of both filters 501, 503 are close to be perpendicular to each other. The actuator 511 can provide a third orientation 515c of the first 501 and the second 503 linear polarizing filters in case of intermediate-light conditions. That third orientation 515c lies in between the first orientation 515a and the second orientation 515b of the linear polarizing filters 501, 503. The first orientation 515a may be a first angle, the second orientation 515b may be a second angle, and the third orientation 515c may be a third angle in between the first angle and the second angle. The first linear polarizing filter 501 may be fixedly mountable in front of the lens unit 509, and the second linear polarizing filter 503 may be movable with respect to the first linear polarizing filter 501 or vice versa. The actuator 511 may rotate the second linear polarizing filter 503 about a rotation axis 516, in particular by at least 90 degrees. The rotation axis 516 may approximately coincide with an optical axis of the lens unit 509, when the apparatus is mounted on the camera 519 as shown in FIG. 5. The apparatus 500 may include an inner ring 507, carrying the second linear polarizing filter 503, and an outer ring 505, carrying the first linear polarizing filter 501. Both, the inner ring 507 and the outer ring 505 may be aligned with the optical axis of the lens unit 509, when the apparatus 500, 600 is mounted on the camera 519. The actuator 511 may include a worm wheel 513 for moving the inner ring 507.

The automotive camera 519 may include a lens unit 509 and an image sensor, comprising a plurality of light sensitive elements, which collect incident light, projected by the lens unit 509 and transform it into an electrical signal. The image sensor may read out the charge collected by the plurality of light sensitive elements with a predetermined frame rate. FIG. 5 shows the apparatus 500, mounted on the automotive camera 519. Integration time of the image sensor for collecting the incident light may be approximately constant. The integration time of the image sensor may be close to a maximum, defined by a time period between two consecutive frame read outs.

One or more of the automotive cameras 519 together with mounted apparatus 500, 600 may be mounted on a vehicle (not depicted in the figures).

The apparatus for light intensity adjustment 500, 600 may be mounted outside of the lens unit 509 that may have a fixed stop diameter, for example in front of the first lens element. The apparatus 500 may include a pair of linear polarizing filters 501, 503, one of which may be fixed in a housing, and another can be rotated by at least 90 degrees. The optical surfaces of the filters 501, 503 may be approximately parallel to each other. The filters 501, 503 may be situated in the housing in such a way that the incident light passes through both of them before it enters the front optical element of the lens unit 509. The moveable filter, in FIGS. 5 and 6 the second linear polarizing filter 503 may be rotated by the actuator 511. Whenever the orientation of the filters 501, 503 is such that they polarize the incident light in the same plane, a maximum of the incident light may reach the lens unit 509 and the sensor. This would be the case in the low-light conditions. Whenever polarizing planes of the filters 501, 503 are close to be perpendicular to each other, only a small portion of the incident light reaches the lens and the sensor. This would correspond to the high-light conditions. Orientations of the filter polarizing planes between the two extremes described above correspond to intermediate lighting conditions.

As shown in FIGS. 5 and 6, the axis of rotation 516 of the moveable filter 503 may coincide with the optical axis of the lens 509. This configuration enables minimizing the form factor of the device. The camera 519 with the lens 509, actuator 511 and the outer ring 505 of the bearing may be mounted in the device housing. The actuator shaft may feature a worm that may be in contact with the worm wheel 513, thus making up a worm gear arrangement. The worm wheel 513 may be firmly attached to the inner ring 507 of the bearing. The stationary polarizer 501 may be attached to the outer ring 505 of the bearing, and the moving polarizer, i.e. the second polarizing filter 503 to the worm wheel 513. A torque from the actuator's rotor may be transferred to the worm, which in turn, rotates the worm wheel 513 with the attached polarizer 503 and the inner ring 507 of the bearing.

An advantage of such an apparatus 500, 600 is that a position sensor, which is typically used to determine the position of moving parts of the mechanism, is not required. The position sensor can be replaced by an algorithm that calibrates the system at the start-up by finding the position where the light intensity is at a maximum (or minimum, respectively). Measurement of the amount of light may be performed by the imager. Once a peak position has been found, other required polarizer positions can be set by counting steps of the stepper motor of the actuator 511.

The stationary outer polarizer, i.e. the first polarizing filter 501 may be equipped with an electrical heater that may be activated manually or automatically, e.g. whenever frost, snow or moisture obscures the view for the camera. This allows eliminating an additional cover glass that is typically placed in front of the lens to protect it from dirt, moisture and frost.

The logic responsible for the pixel integration time adjustment may be eliminated from the imager or supporting integrated circuit, in order to simplify its layout, thus reducing silicon area required for logic implementation and eventually save costs. In this case, pixel integration time may be fixed at the level reasonably close to the frame period. Exposure adjustment may be achieved by changing the intensity of incident light with the use of the two polarizers 501, 503.

Figure 7:
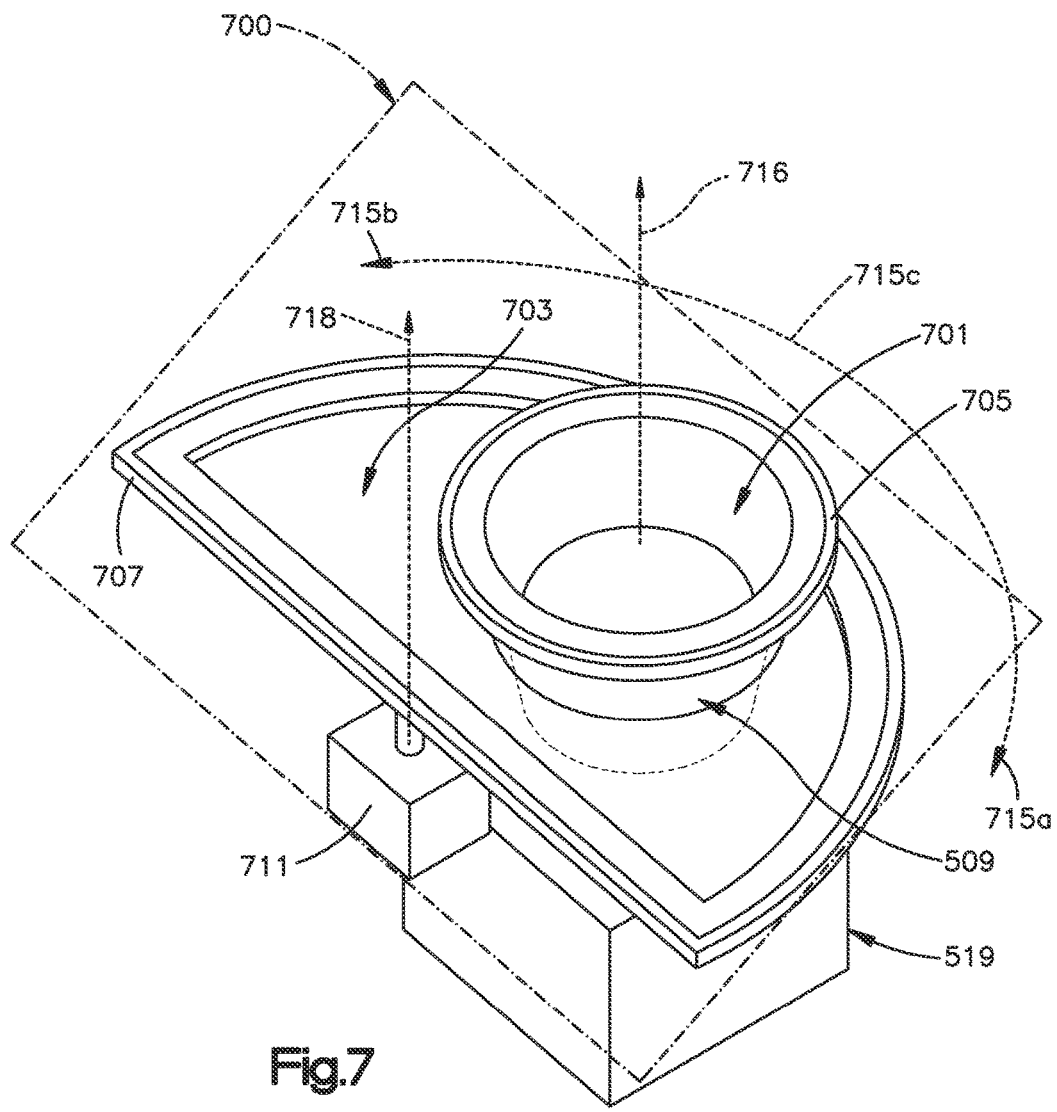
FIG. 7 is a lateral view of an apparatus for light intensity adjustment 700 in a three-dimensional representation according to an implementation form.

FIG. 7 is a lateral view of an apparatus for light intensity adjustment 700 in a three-dimensional representation according to an implementation form.

The apparatus 700 includes a first 701 and a second 703 linear polarizing filter and an actuator 711. The apparatus for light intensity adjustment 700 is mountable on an automotive camera 519 as described above with respect to FIGS. 5 and 6. The first 701 and the second 703 linear polarizing filters are arrangeable in front of the lens unit 509 such that the incident light passes through both of them 701, 703 before entering the lens unit 509. The actuator 711 can move the first 701 and the second 703 linear polarizing filters with respect to each other. By that movement the actuator 711 adapts a light exposure of the image sensor to the frame rate of the image sensor and lighting conditions, when the apparatus 700 is mounted on the automotive camera 719 as depicted in FIG. 7. The apparatus 700 can be mounted on the camera 519 and can be released from the camera 519. While FIG. 7 depicts an automotive camera 519, the apparatus can also be mounted on other kinds of cameras or optical systems, for example iris, telescope, glasses etc. A size of the apparatus may be fitted to a size of the optical system, whereon the apparatus is mounted.

The actuator 711 can provide a first orientation 715a of the first 701 and the second 703 linear polarizing filters in case of low-light conditions. In that first orientation 715a both filters 701, 703 polarize the incident light in a same plane. The actuator 711 can provide a second orientation 715b of the first 701 and the second 703 linear polarizing filters in case of high-light conditions. In that second orientation 715b polarization planes of both filters 701, 703 are close to be perpendicular to each other. The actuator 711 can provide a third orientation 715c of the first 701 and the second 703 linear polarizing filters in case of intermediate-light conditions. That third orientation 715c lies in between the first orientation 715a and the second orientation 715b of the linear polarizing filters 701, 703. The first orientation 715a may be a first angle, the second orientation 715b may be a second angle and the third orientation 715c may be a third angle in between the first angle and the second angle. The first linear polarizing filter 701 may be fixedly mountable in front of the lens unit 509, and the second linear polarizing filter 703 may be movable with respect to the first linear polarizing filter 701 or vice versa. The actuator 711 may rotate the second linear polarizing filter 703 by a rotation axis 716, in particular by at least 90 degrees.

The rotation axis 718 may be approximately parallel to an optical axis 716 of the lens unit 509, when the apparatus is mounted on the camera 519 as shown in FIG. 7. The first linear polarizing filter 701 may be approximately formed as a circle (or as a polygon having n edges), having a center coinciding with the optical axis 716 of the lens unit 509, when the apparatus is mounted on the camera. The second linear polarizing filter 703 may be approximately formed as a semi circle (or as a semi polygon having n/2 edges), having a center coinciding with the rotation axis 718 of the actuator 711. Other geometrical shapes of both filters 701, 703 may be applied as well.

The apparatus 700 may include an inner semi ring 707, carrying the second linear polarizing filter 703, and an outer ring 705, carrying the first linear polarizing filter 701. The inner semi ring 707 may be aligned with a rotation axis 718 of the actuator 711. The outer ring 705 may be aligned with the optical axis 716 of the lens unit 509, when the apparatus 700 is mounted on the camera 519 as depicted in FIG. 7. The rotation axis 718 of the actuator 711 may drive the inner semi ring 707. An area of the inner semi ring 707 may be larger than an area of the outer ring 705.

One or more of the automotive cameras 519 together with mounted apparatus 700 may be mounted on a vehicle (not depicted in the figures).

The apparatus for light intensity adjustment 700 may be mounted outside of the lens unit 509 that may have a fixed stop diameter, for example in front of the first lens element. The apparatus 700 may include a pair of linear polarizing filters 701, 703, one of which may be fixed in a housing, and another can be rotated by at least 90 degrees. The optical surfaces of the filters 701, 703 may be approximately parallel to each other. The filters 701, 703 may be situated in the housing in such a way that the incident light passes through both of them before it enters the front optical element of the lens unit 709. The moveable filter, in FIG. 7 the second linear polarizing filter 703 may be rotated by the actuator 711. Whenever the orientation of the filters 701, 703 is such that they polarize the incident light in the same plane, a maximum of the incident light may reach the lens unit 509 and the sensor. This would be the case in the low-light conditions. Whenever polarizing planes of the filters 701, 703 are close to be perpendicular to each other, only a small portion of the incident light reaches the lens and the sensor. This would correspond to the high-light conditions. Orientations of the filter polarizing planes between the two extremes described above correspond to intermediate lighting conditions.

The axis of rotation 718 of the moveable filter, i.e. the second polarizing filter 703 may not coincide with the optical axis 716 of the lens unit 709 as depicted in FIG. 7. By shifting the axis of rotation 718 to be outside of the outer diameter of the lens 709, the rotation mechanism can be simplified, thus simplifying the integration and reducing the costs of the device while increasing its robustness.

The stationary outer polarizer, i.e. the first polarizing filter 701 may be equipped with an electrical heater as described above with respect to FIG. 5.

The logic responsible for the pixel integration time adjustment may be eliminated from the imager or supporting integrated circuit as described above with respect to FIG. 5.

In addition, while a particular feature or aspect of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present invention. This application is intended to cover any adaptations or variations of the specific aspects discussed herein.

Figure 8:
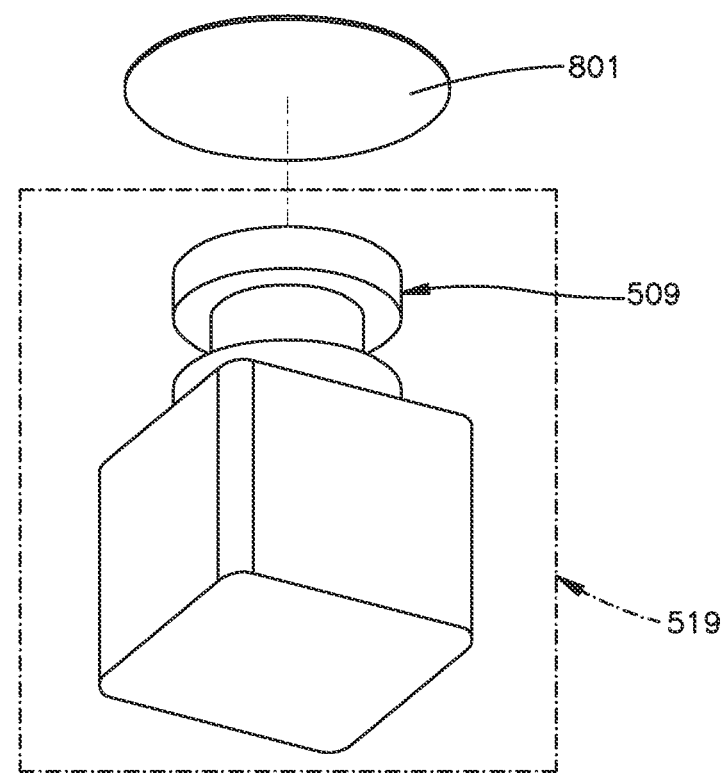
FIG. 8 is an exploded view of a second embodiment of an apparatus.

FIG. 8 illustrates an exploded view of the apparatus 500 comprising a grey filter 801. In the shown embodiment the grey filter 801 comprises a separate part and is mounted in front of the lens unit 509.

FIG. 9a shows the integration time of an image sensor 901 and an upcoming light source pulse 902 within a frame 903 of the state of the art. Because of the relatively short integration time of the image sensor 901 an upcoming light source pulse 902 like a flash or light of a led. In the first frame 903 the upcoming light source pulse 902 is not detected by the image sensor 901. In the following frame 903 the light source pulse 902 is only detected with reduced intensity. Only in the following frame the light source pulse 902 is fully detected by the image sensor 901.

FIG. 9b shows the integration time of an image sensor 901 and an upcoming light source pulse 902 within a frame 903 according to an embodiment of the invention. Because of the extended exposure time of the image sensor 901 the light source pulse 902 is totally detected by the image sensor 901 in the second and third frame 903. Even in the first frame 903 the light source pulse 902 is detected.

FIG. 10 shows an embodiment of an optical member 904 comprising a plurality of optical elements 905. The optical member 904 can be an image sensor and/or lens of the lens unit.

The optical elements 905 are arranged in a plurality of columns 906 and rows 907. In the embodiment shown in FIG. 10 the optical elements 905 of every second row 907 comprise a grey filter 801.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

REFERENCE SIGN LISTING

100: timing diagram illustrating shutter timing effects
200: timing diagram illustrating shutter timing effects
300: timing diagram illustrating shutter timing effects
400: timing diagram illustrating shutter timing effects
500: apparatus for light intensity adjustment
501: first linear polarizing filter
503: second linear polarizing filter
505: outer ring
507: inner ring
509: lens unit
511: actuator
513: worm wheel
516: rotation axis of actuator
517: rotation of worm wheel
519: automotive camera
515a: first orientation of linear polarizing filters
515b: second orientation of linear polarizing filters
515c: third orientation of linear polarizing filters
700: apparatus for light intensity adjustment
701: first linear polarizing filter
703: second linear polarizing filter
705: outer semi ring
707: inner ring
711: actuator
715a: first orientation of linear polarizing filters
715b: second orientation of linear polarizing filters
715c: third orientation of linear polarizing filters
718: rotation axis of actuator
801: grey filter
901: Image sensor
902: light source pulse
903: frame
904: optical member
905: optical element
906: column
907: row

The invention claimed is:

1. An apparatus for light intensity adjustment mountable on an automotive camera, comprising:
    at least one first linear polarizing filter, at least one second linear polarizing filter, the first linear polarizing filter and the second polarizing filter are arrangeable in front of a lens unit of an automotive camera such that incident light passes through the at least one first linear polarizing filter and the at least one second linear polarizing filter before entering the lens unit of the automotive camera; and
    at least one actuator for moving at least one of the at least one first linear polarizing filter and the at least one second linear polarizing filter with respect to each other such that an intensity of emergent light is adjustable,
    wherein an intensity of emergent light is configured to be adjusted by moving at least one of the first linear polarizing filter and the second linear polarizing filter with respect to each other, using the actuator, based on a frame rate of an image sensor of an automotive camera so that integration time of the image sensor is maintained at a maximum,
    wherein the actuator is configured to move at least one of the first linear polarizing filter and the second linear polarizing filter in response to a change in lighting conditions as detected by the image sensor, wherein the first linear polarizing filter is approximately formed as a circle, having a center coinciding with an optical axis of the lens unit when the apparatus is mounted on the camera, and that the second linear polarizing filter is approximately formed as a semi-circle, having a center coinciding with a rotation axis of the actuator, and wherein an area of the second non-polarizing filter is larger than an area of the first non-polarizing filter so that an outer edge of the second non-polarizing filter encompasses a larger area than an outer edge of the first non-polarizing filter, and the second non-polarizing filter fully covers and overlaps the first non-polarizing filter.

2. The apparatus of claim 1, wherein the actuator is configured to provide a first orientation of the first linear polarizing filter and/or the second linear polarizing filter in case of low-light conditions, and both linear polarizing filters polarize the incident light in a same plane.

3. The apparatus of claim 2, wherein the actuator is configured to provide a second orientation of the first linear polarizing filter and the second linear polarizing filter in case of high-light conditions in which second orientation polarization planes of both filters are close to be perpendicular to each other.

4. The apparatus of claim 3, wherein the actuator is configured to provide a third orientation of the first linear polarizing filter and/or the second linear polarizing filter in case of intermediate-light conditions, and the third orientation lies in between the first orientation and the second orientation of the linear polarizing filters.

5. The apparatus of claim 1, wherein the first linear polarizing filter is fixedly mountable in front of the lens unit, and the second linear polarizing filter is movable with respect to the first linear polarizing filter.

6. The apparatus of claim 1, wherein the actuator is configured to rotate the second linear polarizing filter about the rotation axis by at least 90 degrees.

7. The apparatus of claim 6, wherein the rotation axis approximately coincides with an optical axis of the lens unit in response to the apparatus being mounted on the camera.

8. The apparatus of claim 7, further comprising an inner ring, carrying the second linear polarizing filter, and an outer ring, carrying the first linear polarizing filter, wherein both the inner ring and the outer ring are aligned with the optical axis of the lens unit in response to the apparatus being mounted on the camera.

9. The apparatus of claim 8, wherein the actuator comprises a worm wheel configured to move the inner ring.

10. The apparatus of claim 6, wherein the rotation axis is approximately parallel to the optical axis of the lens unit in response to the apparatus being mounted on the camera.

11. An automotive camera, comprising:
at least one lens unit;
at least one image sensor, comprising a plurality of light sensitive elements, configured to collect incident light, projected by the lens unit, and transform it into an electrical signal; and
at least one apparatus for light intensity adjustment according to claim 1 which is mounted or mountable in front of the lens unit,
wherein the image sensor is configured to read out the charge collected by the plurality of light sensitive elements with a predetermined frame rate.

12. The automotive camera of claim 11, wherein an integration time of the image sensor for collecting the incident light is approximately constant.

13. The automotive camera of claim 12, wherein the integration time of the image sensor is close to a maximum, defined by a time period between two consecutive frame read outs.

14. A vehicle, comprising at least one automotive camera according to claim 11.

15. A method for adjusting light intensity by an apparatus for light intensity adjustment according to claim 1, mountable on an automotive camera, the method comprising:
moving at least one of the first linear polarizing filter and the second linear polarizing filter with respect to each other so that integration time of the sensor is maintained at the maximum.

16. The method according to claim 15, further comprising reading out optical elements and calculating an offset.

* * * * *